United States Patent
Yuen et al.

(10) Patent No.: US 7,861,645 B2
(45) Date of Patent: Jan. 4, 2011

(54) APPARATUS FOR PREVENTING UNINTENDED OR PREMATURE RELEASE OF LIQUID IN A BEVERAGE BREWING DEVICE AND METHOD THEREOF

(75) Inventors: Kin Fai Yuen, Tai Po (HK); Wai Ming Wong, Tai Po (HK)

(73) Assignee: Electrical and Electronics Limited, Hong Kong (HK)

( * ) Notice: Subject to any disclaimer, the term of this patent is extended or adjusted under 35 U.S.C. 154(b) by 1417 days.

(21) Appl. No.: 11/251,026

(22) Filed: Oct. 14, 2005

(65) Prior Publication Data

US 2007/0084352 A1 Apr. 19, 2007

(51) Int. Cl.
*A47J 31/00* (2006.01)
(52) U.S. Cl. ........................ 99/302 R; 99/315
(58) Field of Classification Search ............... 99/302 R, 99/315, 293, 295
See application file for complete search history.

(56) References Cited

U.S. PATENT DOCUMENTS

| | | | |
|---|---|---|---|
| 4,055,114 A | 10/1977 | Kats et al. | |
| 5,103,716 A * | 4/1992 | Mikkelsen | 99/289 R |
| 5,794,519 A | 8/1998 | Fischer | |
| 6,510,783 B1 * | 1/2003 | Basile et al. | 99/289 R |
| 6,595,108 B1 * | 7/2003 | Blanc | 99/295 |

FOREIGN PATENT DOCUMENTS

| | | |
|---|---|---|
| CN | 1552264 A | 12/2004 |
| CN | 1575707 A | 2/2005 |
| CN | 1404369 A | 3/2005 |
| CN | 1835699 A | 9/2006 |
| CN | 2817685 Y | 9/2006 |
| DE | 10334544 | 2/2005 |
| DE | 10334544 A1 | 2/2005 |
| EP | 0091634 A1 | 10/1983 |
| EP | 1639922 A2 | 3/2006 |
| GB | 2321179 A | 7/1998 |
| GB | 2329825 A | 7/1999 |

OTHER PUBLICATIONS

Zhu, et al., "Research of Automatic Coffee Maker", China Academic Journal Electronic Publishing House, pp. 49-51 (2005).
Chinese Search Report for Electrical & Electronics Limited, Chinese App'l No. 200610136006.7, Filed Oct. 13, 2006, Dated Nov. 6, 2006.

* cited by examiner

*Primary Examiner*—Reginald L Alexander
(74) *Attorney, Agent, or Firm*—George A Herbster

(57) ABSTRACT

An apparatus useful for preventing the release of residual liquid in a beverage brewing device prior to and after the brewing process, and for preventing the premature release of liquid during the heating process is disclosed. The apparatus includes a flexible member, a closing member and a recess. The apparatus is fabricated such that the pressure of the liquid being delivered to the brewing chamber displaces or depresses the closing member sufficiently into the recess to form a first fluid passage. The pressure of the fluid also creates a channel or cavity on a surface of the flexible member. The first fluid passage and the channel or cavity form a second fluid passages which provide fluid communication between the fluid inlet and the brewing chamber. Preferably, the flexible member, closing member and recess is formed as an integral unit.

18 Claims, 8 Drawing Sheets

APPARATUS FOR PREVENTING UNINTENDED OR PREMATURE RELEASE OF LIQUID IN A BEVERAGE BREWING DEVICE AND METHOD THEREOF

Throughout this application, various publications are referenced. The disclosures of these publications in their entireties are hereby incorporated by reference into this application to more fully describe the state of the art to which this invention pertains.

FIELD OF THE INVENTION

This invention relates to an apparatus and method for preventing the release of residual liquid from the brewing assembly of a beverage brewing device before or after the brewing process; for expelling residual liquid remaining in brewing assembly after the brewing process; and/or for preventing the premature release of liquid from the boiler during the heating process.

BACKGROUND OF THE INVENTION

Over the years, different types of beverage brewing devices have been developed. One type of beverage brewing device has an upper member or portion which opens upward on a pivot to allow users to access or clean the brewing chamber, or to replace the filter or the granular brew-able materials, such as coffee grounds, tea leaves or the like, which are suitable for preparing consumable beverages.

This type of device may include a brewing chamber configured for brewing the contents of a capsule or pod to prepare a beverage. Typically for this type of brewing device, heated liquid flows into the brewing chamber from a fluid inlet provided on the upper member of the brewing assembly, and the brewed beverage is delivered from the brewing chamber through a fluid outlet provided on the lower member or portion of the brewing assembly. A device for brewing beverage capsule (pod) is designed so that when liquid or a mixture of water and steam flows into the brewing chamber, virtually all the fluid or mixture of water and steam will pass through the capsule. The efficiency of the brewing process to extract the full flavor from the soluble or extractable substances contained in the capsule is then maximized.

After the brewing cycle, the used capsule is removed from the brewing chamber, and replaced with a new capsule. To replace the used capsule, the brewing chamber has to be opened. This is accomplished by opening the upper member of the brewing assembly in a pivoting manner. During this operation, the liquid remaining in the fluid inlet will drip or splash down on the capsule, and cause the brewing device to discharge residual liquid during the removal of the capsule, which is highly undesirable and inconveniences the user.

Also, any newly inserted replacement capsule will be contaminated or infiltrated by residual liquid remaining in the brewing assembly before or after the brewing process, and/or by liquid prematurely released from boiler during heating. This can cause premature dissolution and/or clumping of the substance in the capsule, thereby adversely affecting the taste and flavor of the brewed beverage. Additionally, if sufficient amount of residual liquid has infiltrated the capsule, it may cause the substance in the capsule to be brewed at a less than optimal temperature, thus altering the original taste and flavor of the brewed beverage.

Accordingly, there exists a need for an apparatus and method for preventing and/or eliminating the undesirable release of residual liquid remaining in the brewing assembly before or after the brewing process, and liquid prematurely released from the boiler during heating.

SUMMARY OF THE INVENTION

This invention provides a brewing assembly, comprising an upper portion operatively connected to a lower portion, a seal for fluid-tight connection between the upper portion and the lower portion during brewing process, a fluid inlet provided on the upper portion, a distribution plate operatively attached to the upper portion, a flexible member provided between the distribution plate and the upper portion, and a brewing chamber defined by the upper and lower portion of the brewing assembly.

This invention provides a method for preventing the unintended or premature release liquid from a beverage brewing device, comprising the steps of: (1) Obtaining the arrangement, size and position of a fluid inlet provided on said device; (2) Determining the pressure of fluid flowing through the fluid inlet during brewing process; and (3) Providing a flexible member having an appropriately placed closing member, wherein the closing member is biased against an opening of the fluid inlet, and wherein the closing member is fabricated such that pressure exerted by the fluid flowing from the fluid inlet during the brewing process displaces or depresses the closing member sufficiently into a recess provided below the closing member to form a first fluid passage, wherein pressure exerted by the fluid flowing from the fluid inlet forms a channel or cavity on a surface of the flexible member, wherein the first fluid passage and the channel or cavity form a second fluid passage which provides fluid communication between the fluid inlet and a brewing chamber.

This invention provides a flexible member for preventing unintended or premature release of liquid in a brewing assembly, comprising: one or more perforations provided on the flexible member, the perforations being configured to provide uniform distribution of liquid to a brewing chamber; a closing member provided on one side of the flexible member, the closing member comprising a protrusion; and a recess provided on the other side of the flexible member permitting the closing member to be displaced from a close position to an open position when liquid flowing into the brewing assembly achieves a predetermined pressure, wherein the pressure causes elastic deformation of the flexible member, and the displacement of closing member to the open position to form a fluid passage.

This invention provides a flexible member for preventing unintended or premature release of liquid in a brewing assembly, comprising: one or more perforations provided on the flexible member, the perforations configured to provide uniform distribution of liquid to a brewing chamber; a closing member provided on one side of the flexible member, the closing member comprising a portion dimensioned and positioned for closing a fluid inlet on the brewing assembly; and a recess provided on the other side of the flexible member permitting the closing member to be displaced from a closed position to an open position when liquid flowing into the brewing assembly achieves a predetermined pressure, wherein the pressure causes elastic deformation of the flexible member, and the displacement of closing member to the open position to form a fluid passage.

This invention provides an apparatus for closing a fluid inlet of the brewing assembly before and after the brewing process. Therefore, liquid, such as water or a mixture of water and steam, is introduced into the brewing chamber only when intended by the system or brewing device. This apparatus is designed to prevent liquid from flowing into the brewing chamber, and causing spillage or contamination of the brewable substance.

A brewing device configured to accept capsules (pods) generally includes the following components or parts: an upper portion operatively connected to a lower portion, a fluid inlet and a brewed beverage outlet, and all the components function or fit together to form a pressure- and/or liquid-tight seal.

To insert or remove the capsule, the brewing assembly is generally opened by pivoting the upper portion upward. The brewing assembly can also be fabricated or constructed so that the upper portion can be opened vertically. The upper portion of the brewing assembly, also referred to herein as brewing chamber lid, includes a component or assembly for providing even distribution of heated liquid or a mixture of water and steam to the capsule, such as a water distribution plate, and a fluid inlet.

It is an object of this invention to prevent liquid from accumulating in the components or parts of the brewing assembly after the completion of the brewing process. It is another object of this invention to prevent unintended and undesirable release of residual liquid after the completion of the brewing process, especially when the upper portion is being opened by the user to clean the brewing assembly or to replace the capsule.

It is still another object of this invention to provide an apparatus to prevent the accumulation of residual liquid in the components or parts of the brewing assembly before or after the brewing process. Preferably, the apparatus is a flexible member provided between the brewing chamber lid and the water distribution plate. In an embodiment, the flexible member includes a closing member. The closing member is fabricated or formed such that the fluid inlet provided on the upper portion of the brewing assembly is closed when liquid or a mixture of water and steam is not flowing into the brewing chamber. The flexible member and the closing member are preferably constructed of a heat-resistant, flexible material such as rubber, silicon rubber, or a suitable synthetic or naturally derived polymer or plastic.

In an embodiment, the flexible member and the closing member are formed or molded as a single piece. In another embodiment, the flexible member and the closing member are separate pieces or parts joined to one another.

When liquid is being delivered into the brewing chamber, the flexible member will deform to create a flow path, and the liquid will flow to the water distribution plate. For example, a flexible member is constructed such that the pressure or force of the liquid or water delivered through an opening on the upper portion of the brewing assembly opens the closing member and forms at least one channel or a cavity to allow the liquid or water to flow to the water distribution plate through perforations provided on the flexible member. Once the pressure or the force dissipates, typically brought about by the completion of the brewing process, the elastic properties of the flexible member will cause the channels and/or cavity to collapse, and any water or liquid remaining the channels and/or cavity is then expelled.

Furthermore, after the completion of the brewing process, the closing member will resume or return to its original shape and position to close off fluid communication between the fluid inlet and the brewing chamber. This invention has the capability of eliminating the accumulation and spillage of residual liquid from the brewing assembly of a brewing device.

Due to the elastic restoring force of the flexible member, the flexible member will return to its original shape and position, and at the same time, expel the liquid or water remaining in the brewing assembly, such as between the brew chamber lid and the flexible member. Liquid or water removal by the flexible member is accomplished as follows: During the brewing process, at least one channel and/or cavity is formed between the brew chamber lid and the flexible member due to the elastic deformation of the flexible member caused by the force and/or pressure of the liquid delivered through the fluid inlet. After the brewing process, the liquid remaining on the surface of the components in the brewing assembly, especially on the water distribution plate or on the flexible member, is expelled by the rapid and/or sudden collapse of the channel(s) and/or cavity formed on the flexible member.

DETAILED DESCRIPTION OF THE FIGURES

This invention provides an assembly or apparatus for closing off fluid communication between the fluid inlet and the brewing chamber before and after the brewing process, and for preventing the accumulation of residual liquid in the brewing assembly after the brewing process. Embodiments of the invention, as non limitative embodiments, are shown in the accompanying drawings, wherein.

Figure 5A:
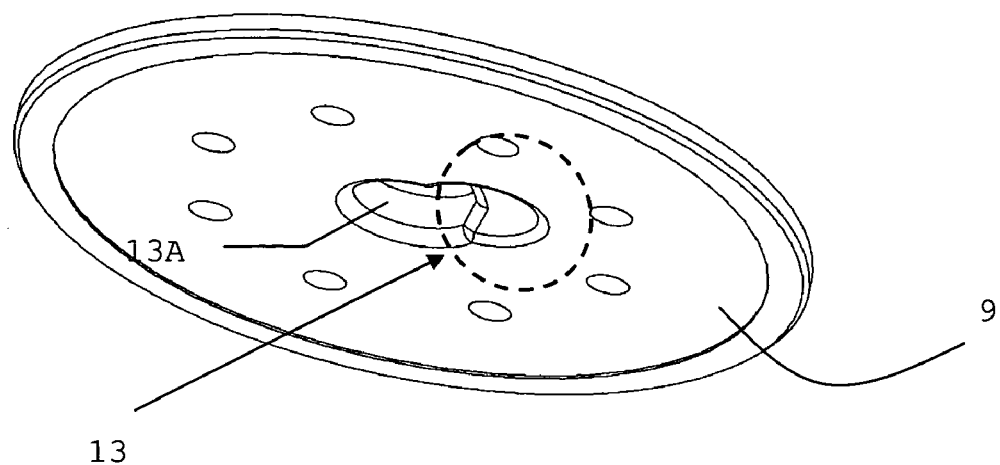
FIG. 5A shows the bottom side of a flexible member of this invention.
Figure 5B:
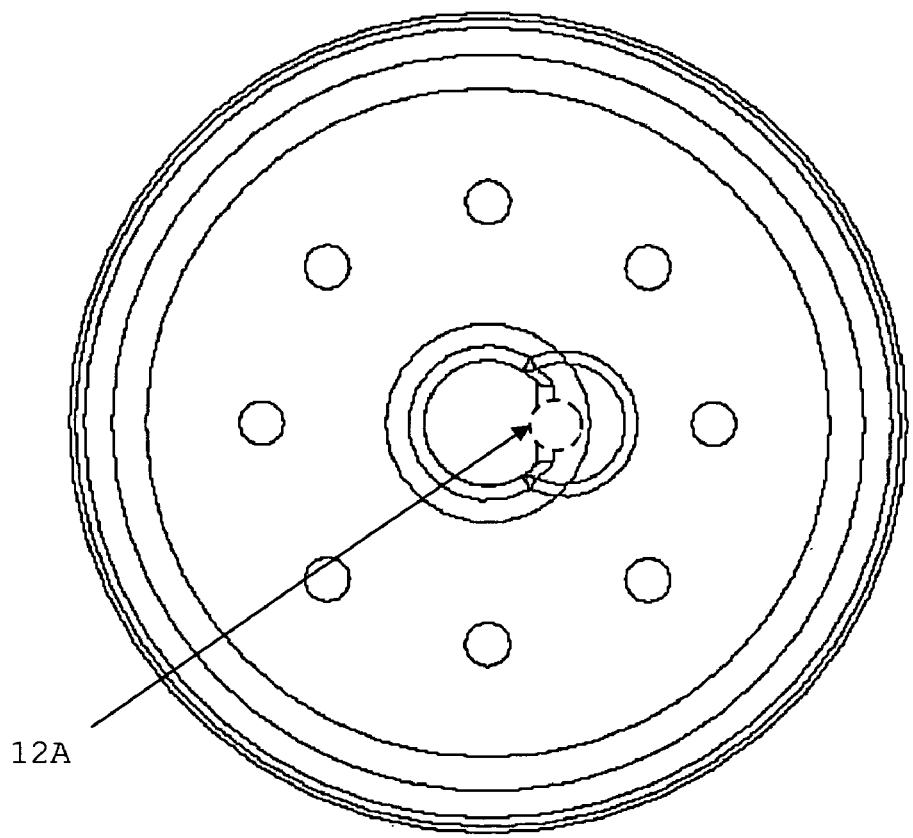

FIG. 5B shows a flat view of the bottom side of a flexible member. The dashed circle shows the cylindrical-shaped protrusion (12A) of the closing member located on the top side of the flexible member. In an embodiment, the protrusion is dimensioned and/or positioned to close off an opening in the fluid inlet provided on the upper portion of the brewing assembly when the closing member is in the closed position. The protrusion and closing member is urged downwardly under a predetermined fluid pressure.

Figure 6:
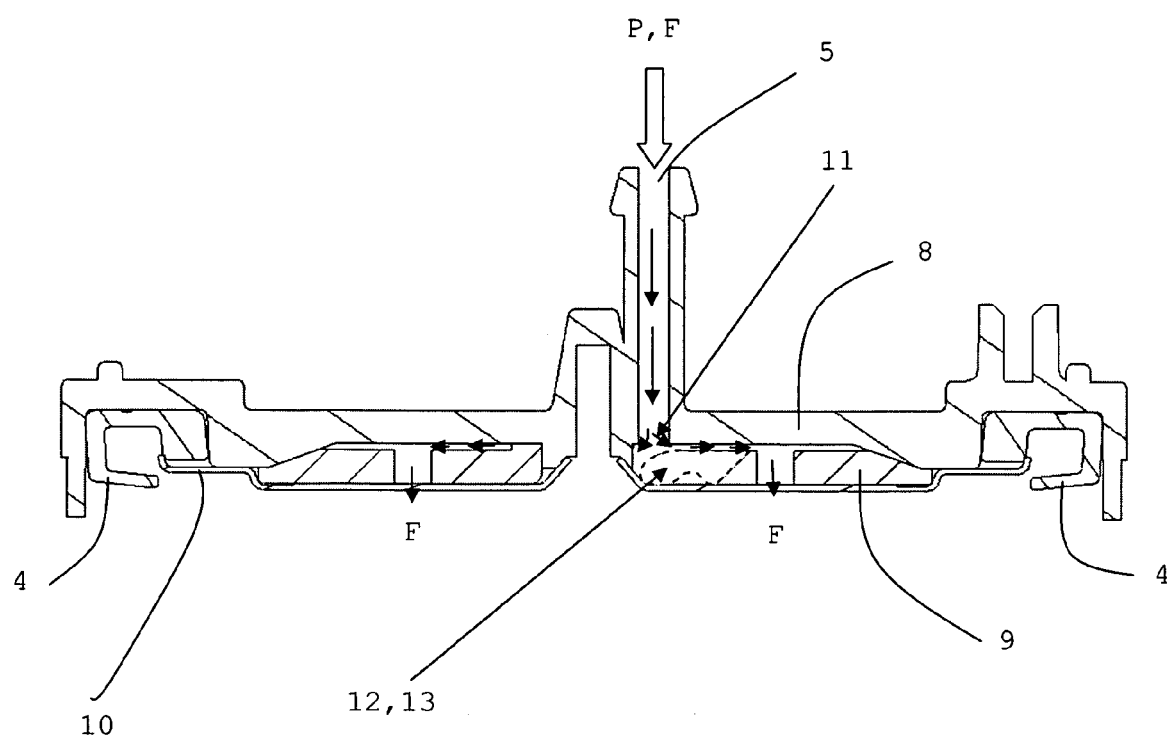

FIG. 6 shows a cross section of the upper portion of a brewing assembly. The pressure or force of the liquid or mixture of water and steam flowing through the fluid inlet results in the deformation of the flexible member and the closing member.

Figure 7A:
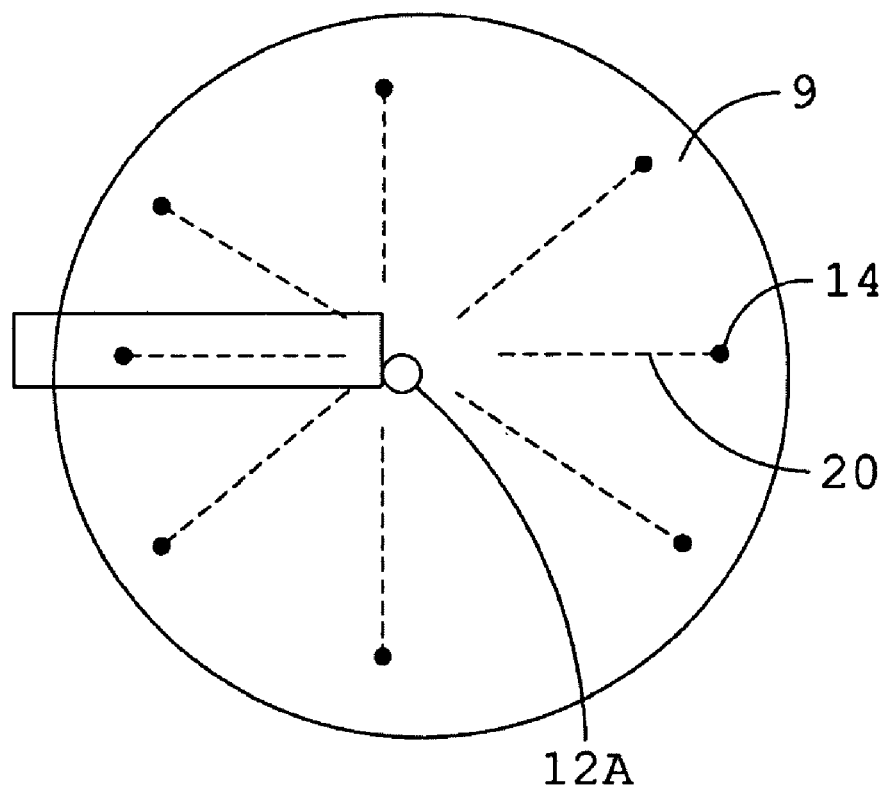

FIG. 7A shows a flexible comprising channel forming slits (dashed lines) for facilitating controlled deformation and uniform distribution of liquid.

Figure 7B:
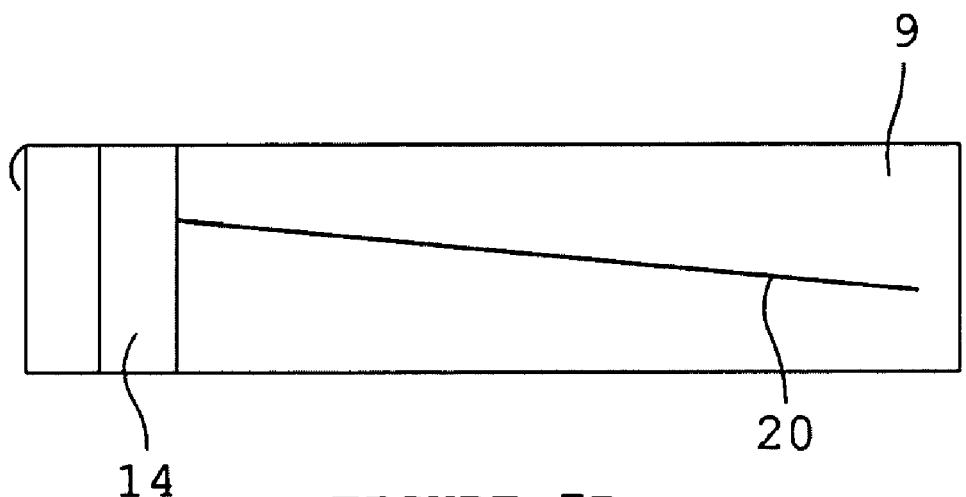

FIG. 7B shows a cutaway side view of the flexible member with the channel/cavity forming slits extending at an incline.

Figure 8:
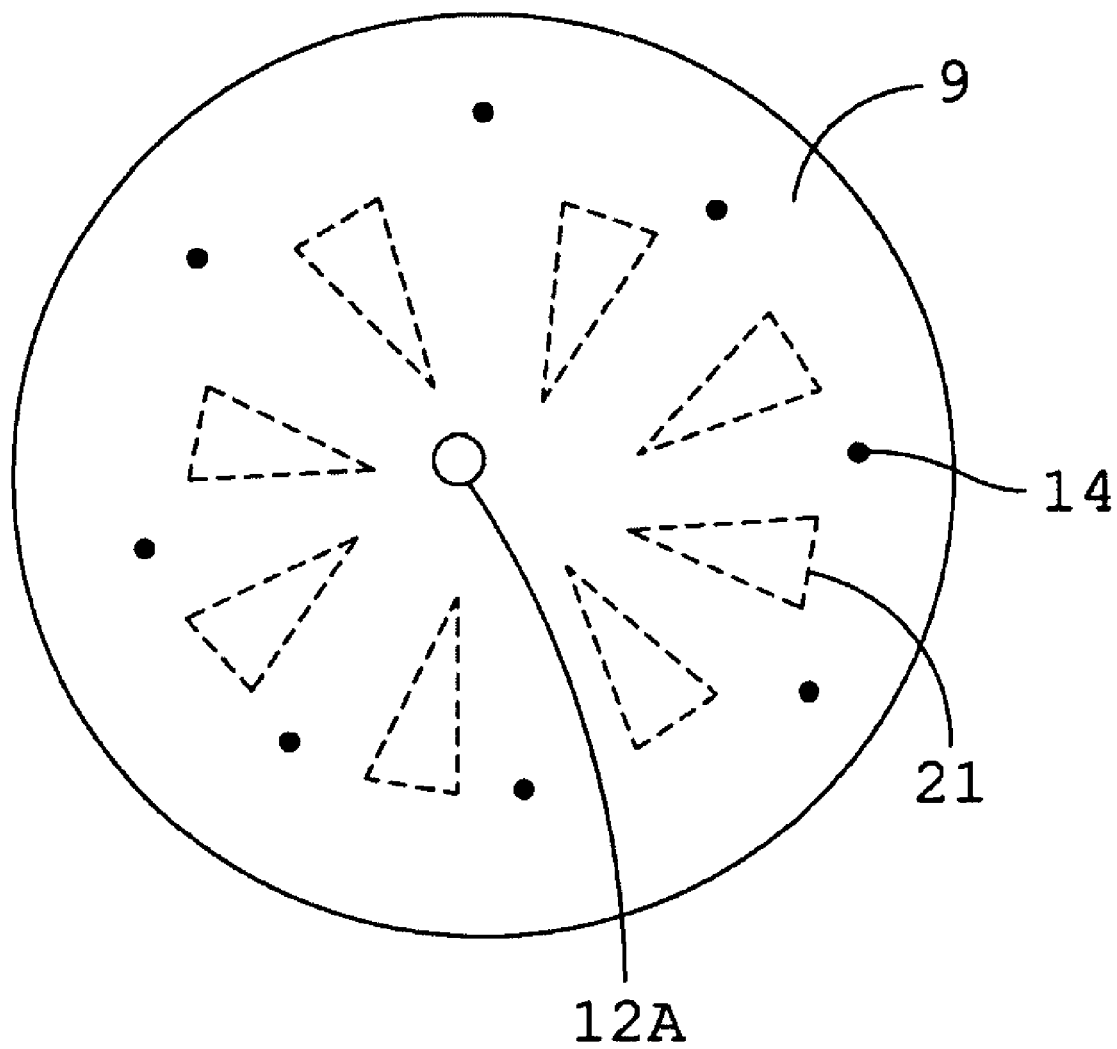

FIG. 8 shows a flexible member comprising triangular shaped (dashed lines) portions or objects for facilitating controlled deformation and uniform distribution of liquid. The portions or objections are not limited to any one shape.

The present invention will be described in connection with preferred embodiments, however, it will be understood that this is no intent to limit the invention to the embodiments described. On the contrary, the intent is to cover all alternatives, modifications, and equivalents as may be included within the spirit and scope of the invention as defined by the appended claims.

DETAILED DESCRIPTION OF THE INVENTION

This invention provides a brewing assembly, comprising an upper portion operatively connected to a lower portion, a seal for fluid-tight connection between the upper portion and the lower portion during brewing process, a fluid inlet provided on the upper portion, a distribution plate operatively attached to the upper portion, a flexible member provided between the distribution plate and the upper portion, and a brewing chamber defined by the upper and lower portion of the brewing assembly.

In an embodiment of the invention, the flexible member further comprises a closing member for selectively establishing and interrupting fluid communication between the fluid inlet and the brewing chamber.

In an embodiment of the invention, a recess is provided substantially below the closing member to permit fluid pressure to displace or depress the closing member sufficiently into the recess to form a first fluid passage, a channel or cavity is formed on a surface of the flexible member by fluid pressure during brewing process, the first fluid passage and the channel or cavity form a second fluid passage which provides fluid communication from the fluid inlet to the brewing chamber, and after or before brewing process, the closing member is biased to a closed position to interrupt fluid communication between the fluid inlet and the brewing chamber. In another embodiment, walls forming the recess have a thinner wall thickness than surrounding portion of the flexible member.

In an embodiment of the invention, the fluid pressure is between 0.1 and 1 bar. In another embodiment, the pressure is 0.4 to 0.8 bars. Preferably, the pressure is 0.6 bars.

In an embodiment of the invention, the closing member and the recess are located substantially at the center of the flexible member. In another embodiment, the closing member and the recess are positioned slightly offset from the center of flexible member. In a further embodiment, the closing member is integrally formed as part of the flexible member. In a further embodiment, the closing member and the flexible member are formed as separate elements.

In an embodiment of the invention, the flexible member comprises a radial array of perforations or openings to provide fluid communication to the distribution plate. In another embodiment, the flexible member comprises eight perforations or openings. In a further embodiment, the flexible member is substantially coextensive with a surface of the flexible member.

In an embodiment of the invention, the flexible member comprises at least one perforation or opening. In another embodiment, the perforation or opening is arranged in a circular configuration. In a further embodiment, the flexible member is formed of a polymer material, a silicone material, a rubber, a silicon rubber, a polymer plastic, or a suitable heat-resistant, flexible polymer material. In a further embodiment, the flexible member has a slight funnel shape.

In an embodiment of the invention, the distribution plate and the flexible member are attached to the upper portion by a screw, rivet, adhesive, nail, or a suitable fastener.

In an embodiment of the invention, the flexible and closing members are formed with an appropriate degree of rigidity or flexibility, depending on a fluid pressure needed to form fluid passage through the flexible and closing member, the closing member being biased to a closed position to interrupt fluid communication between the fluid inlet and the brewing chamber prior to or after brewing process.

This invention provides a method for preventing the unintended or premature release liquid from a beverage brewing device, comprising the steps of: (1) Obtaining the arrangement, size and position of a fluid inlet provided on said device; (2) Determining the pressure of fluid flowing through the fluid inlet during brewing process; and (3). Providing a flexible member having an appropriately placed closing member, wherein the closing member is biased against an opening of the fluid inlet, and wherein the closing member is fabricated such that pressure exerted by the fluid flowing from the fluid inlet during the brewing process displaces or depresses the closing member sufficiently into a recess provided below the closing member to form a first fluid passage, wherein pressure exerted by the fluid flowing from the fluid inlet forms a channel or cavity on a surface of the flexible member, wherein the first fluid passage and the channel or cavity form a second fluid passage which provides fluid communication between the fluid inlet and a brewing chamber.

This invention provides a flexible member for preventing unintended or premature release of liquid in a brewing assembly, comprising: one or more perforations provided on the flexible member, the perforations being configured to provide uniform distribution of liquid to a brewing chamber; a closing member provided on one side of the flexible member, the closing member comprising a protrusion; and a recess provided on the other side of the flexible member permitting the closing member to be displaced from a closed position to an open position when liquid flowing into the brewing assembly achieves a predetermined pressure, wherein the pressure causes elastic deformation of the flexible member, and the displacement of closing member to the open position to form a fluid passage.

In an embodiment of the invention, the flexible member further comprises one or more slits to provide deformation of the flexible member along the length of the slit. In another embodiment, the slit extends toward the perforation. In a further embodiment, the slit extends toward the perforation.

In an embodiment, the flexible member of the invention further comprises one or more objects or sections having higher density or rigidity than surrounding area of the flexible member, each object or section is configured to control deformation of the flexible member along the periphery of the object or section.

In another embodiment, the fluid pressure is between 0.1 and 1 bar. In a further embodiment, the pressure is 0.4 to 0.8 bars. Preferably, the pressure is 0.6 bar.

This invention provides a device comprising the flexible member of the invention.

EXEMPLIFICATION

The invention being generally described, will be more readily understood by reference to the following examples which are included merely for purposes of illustration of certain aspects and embodiments of the present invention, and are not intended to limit the invention.

Figure 1:
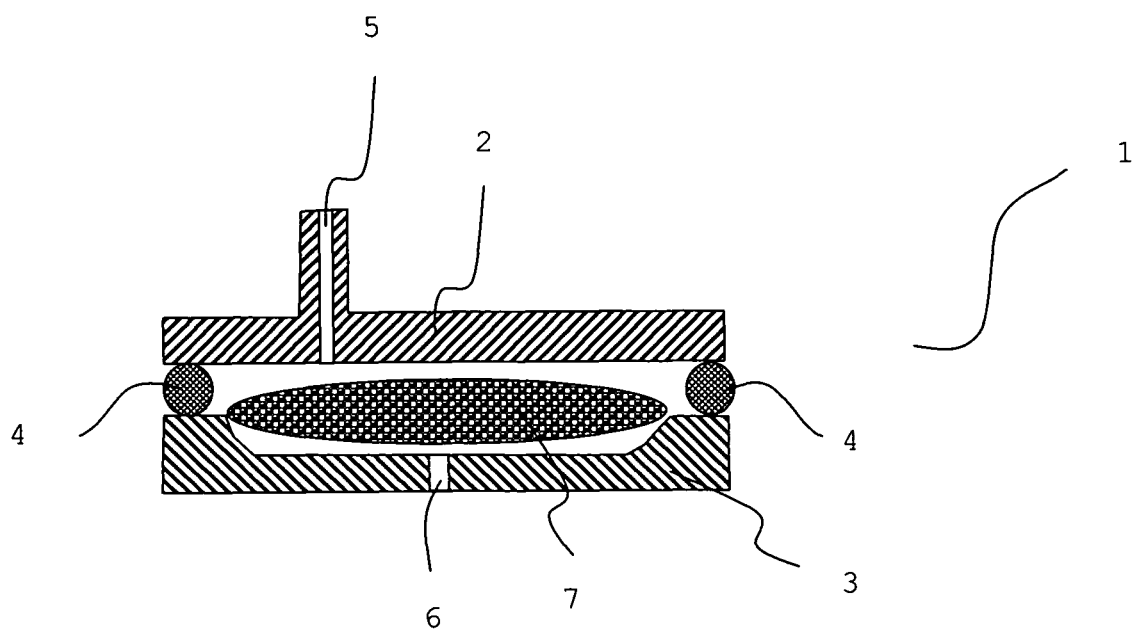
FIG. 1 shows a layout of a brewing assembly.
Figure 2:
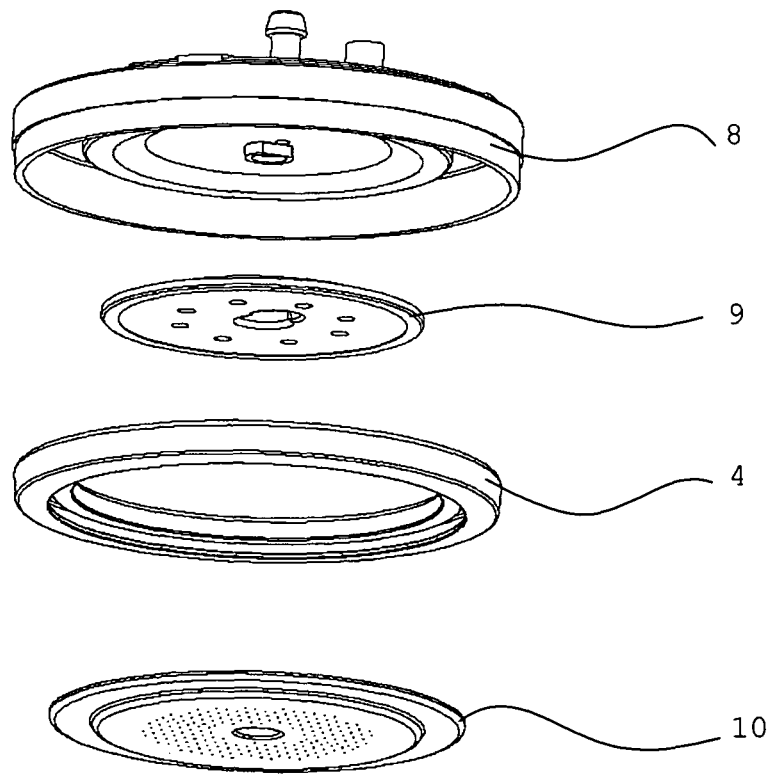
FIG. 2 is an exploded view of the components or parts of a brewing assembly which form the upper portion of the brewing assembly. The upper portion of brewing assembly includes a flexible member.

Referring to the figures, the general layout of a brewing assembly (1) is shown in FIG. 1. The brewing assembly comprises an upper portion (2) operatively joined to, a lower portion (3), a seal (4), a fluid inlet (5) provided on the upper portion, and a fluid outlet (6) provided on the lower portion. As shown in FIG. 2, the upper portion (2) includes a water distribution plate (10) and a flexible member (9). The water distribution plate (10) and the flexible member (9) are preferably attached to an upper body (8) of the brewing assembly by a screw. The water distribution plate (10) and the flexible member (9) may also be attached to the upper body (8) of the upper portion (2) by a fastener including but is not limited to as a rivet, bolt, nail, adhesive, or the like.

The upper and lower portion of the brewing assembly (1) and the seal (4) are configured to form a fluid-tight connection. A capsule (7) is placed or contained in the brewing chamber or cavity defined by upper and lower portions (2) and (3) of the brewing assembly (1), such as when the brewing assembly (1) is in the closed position.

During the brewing process, liquid or a mixture of water and steam flows into the brewing chamber through the fluid inlet (5) to extract or dissolve the substance, such as coffee or tea leaves, contained in the capsule. The brewed beverage is discharged or released from the brewing assembly (1) via the fluid outlet (6).

A consistent, high quality and efficiently brewed beverage requires a uniform flow of liquid or mixture of water and steam through the capsule (7) or the brew-able substance, e.g., coffee grounds. A uniform flow of liquid or water and steam through the capsule or brewing chamber is achieved by providing a flexible member between the upper body (8) of the brewing assembly and the water distribution plate (10) as shown in FIG. 2. In an embodiment, the brewing assembly is configured such that all the liquid flows to the fluid outlet through the pod or capsule at a longest path without any bypass from the edge of the pod or capsule to ensure good extraction.

FIG. 2 shows a seal (4) for providing a fluid-tight connection between the upper and lower portion of the brewing assembly. FIG. 2 also shows a flexible member (9) positioned between the upper portion of the brewing assembly, also referred to herein as the brewing chamber lid (8), and the water distribution plate (10).

Figure 3:
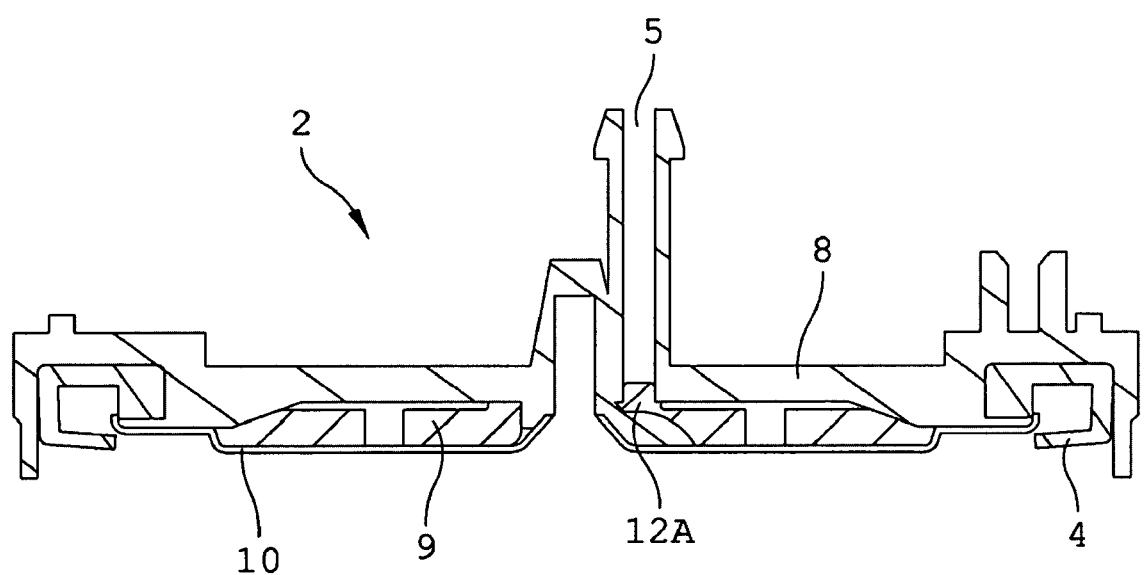
FIG. 3 shows a cross section of the upper portion of the brewing assembly, which includes a flexible member.

FIG. 3 shows a cross section of the upper portion (2) of the brewing assembly (1) when no liquid is flowing through the fluid inlet. When the brewing device is in operation, liquid fed through the fluid inlet (5) of the brewing chamber lid (8) passes through the flexible member (9) and the water distribution plate (10) before entering the brewing chamber.

Figure 4A:
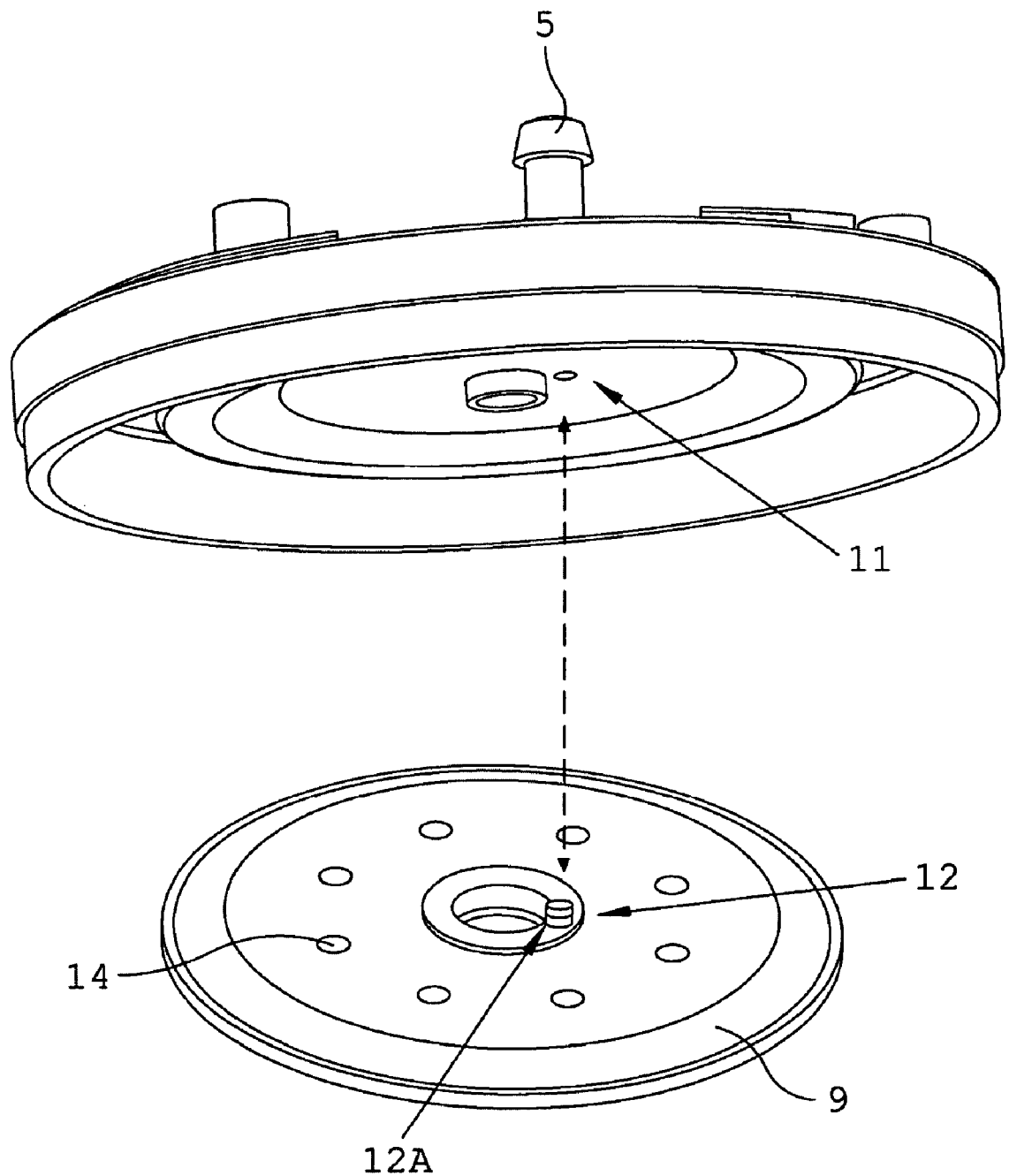
FIG. 4A shows the top side of a flexible member. The flexible member includes a closing member.
Figure 4B:
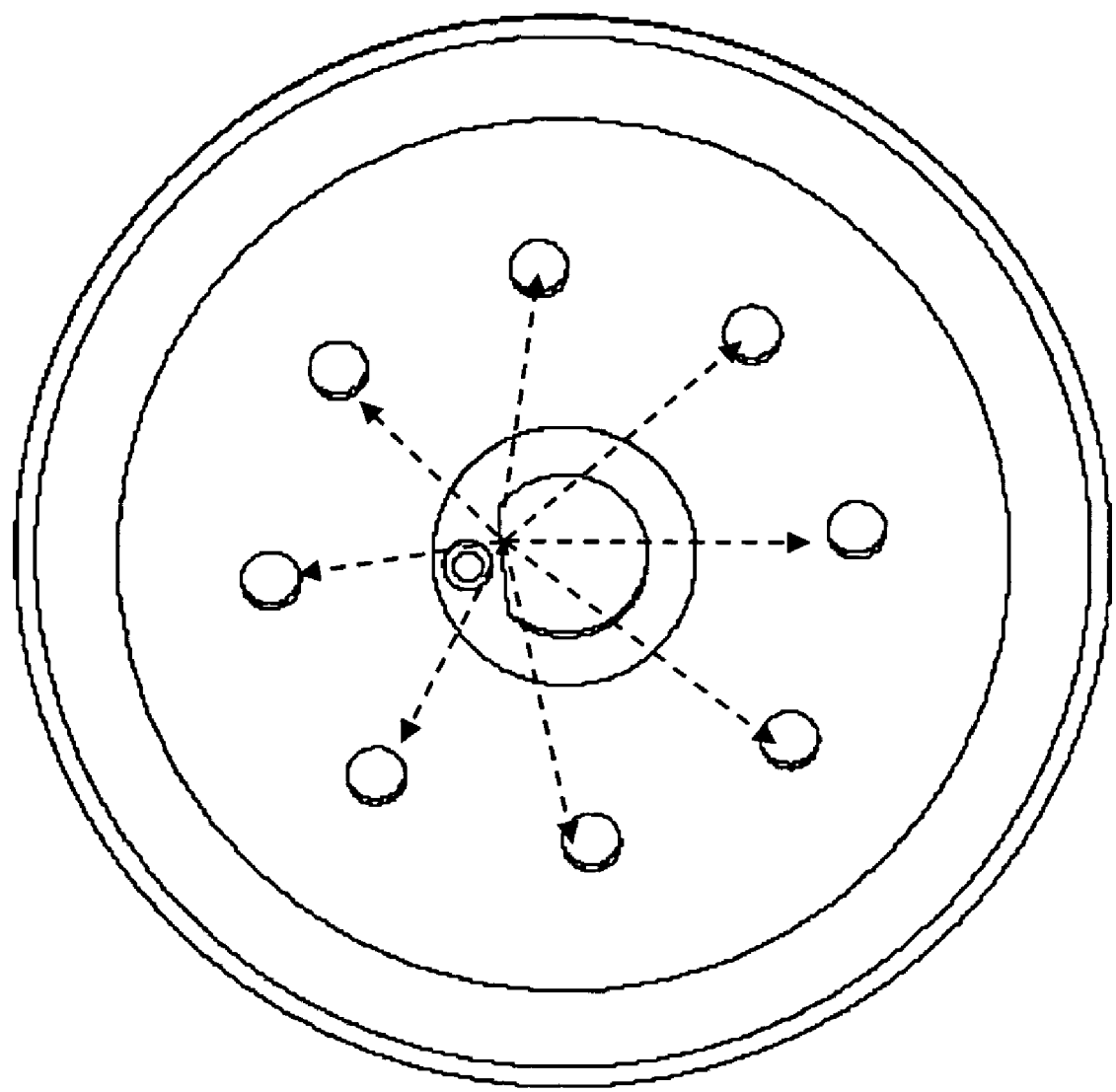
FIG. 4B shows a flat view the top side of the flexible member. The dashed lines shows the flow path of the liquid to the perforations, when the flexible member is in the deformed state.

FIG. 4A shows a closing member (12) provided on the flexible member (9). The closing member is preferably integrally formed as part of the flexible member. In one embodiment, the flexible member and the closing member is formed of a suitable plastic material. In another embodiment, the material is moldable to permit the flexible member and the closing member to be formed using a molding process, such as injection molding.

When no liquid or mixture of water and steam is fed through the fluid inlet (5) of the brewing chamber lid (8), i.e., before or after the brewing process, the closing member (12) is normally in a closed position to prevent the passage of liquid through an opening (11) of the fluid inlet (5). In addition, when the closing member is the closed position, liquid will not be prematurely released during the heating process. The flexible member (9) includes perforations to allow passage of liquid from the fluid inlet to the water distribution plate. In an embodiment, the perforations are arranged in a circular configuration. In another embodiment, the perforations are positioned at an appropriate distance from the center of the flexible member. As used herein, "appropriate distance" means, for example, the distance necessary to provide uniform distribution of liquid to the water distribution plate. In a preferred embodiment, the flexible member comprises eight perforations or openings arranged in a circular configuration. In a further embodiment, the perforations are provided near the periphery of the flexible member. In a further embodiment, an opening (13A) is provided on the flexible member for mounting the water distribution plate and the flexible member to the upper portion of the brewing assembly. In a further embodiment, the flexible member includes a recess (13) to permit elastic deformation of the closing member. In a further embodiment, the flexible member covers substantially the surface of the water distribution plate.

The arrangement, position and number of perforations or openings, and/or the size of the perforations or openings suitable for providing uniform distribution of liquid to the water distribution plate will be readily apparent to one of ordinary skill in the art reading the teaching herein.

The recess (13) permits the liquid or mixture of water and steam flowing into the brewing chamber to displace or depress the closing member downward to create or form a fluid passage. Once the brewing process is complete, the closing member will return to the normally fully closed position to prevent the passage of fluid through the fluid inlet. In an embodiment, walls forming or defining the recess (13) have a thinner wall thickness than the surrounding area or section of the flexible member (9). The thickness of the walls defining the recess can be altered to vary the sensitivity of the closing member in responding to the pressure or force exerted by the liquid flowing into the brewing chamber during the brewing process. See FIG. 5. In another embodiment, the closing member and the recess is provided substantially at the center of the flexible member. In a further embodiment, the closing member and/or the recess is positioned slightly offset from the center of the flexible member. In a further embodiment, the closing member protrudes from one surface of the flexible member, and a cavity or recess is provided on the other surface of the flexible member. In a further embodiment, the recess is provided substantially below the closing member.

As shown in FIG. 6, when liquid or a mixture of water and steam (F) is fed through the fluid inlet (5) provided on the brewing chamber lid (8), the fluid pressure (P) exerted against the closing member forces the closing member (12) to move away from the opening (11) of the fluid inlet, and depresses the closing member into the recess (13). A flow passage is created to allow the liquid to flow from the fluid inlet (5) to the water distribution plate (10). The amount of fluid pressure required to displace the closing member and to form channel (s) or a cavity on the flexible member to create a flow passage can be between 0.1 and 1.0 bar, preferably 0.6 bar. In one embodiment, the fluid pressure is between 0.4 and 0.8 bar. In a further embodiment, the flexible member will preferably be a slight funnel shape. A funnel shaped flexible member provides the advantage of enhanced sealing in the radial direction. The degree of rigidity or flexibility of the flexible member and/or the closing member can be varied depending on the operating condition of the brewing device the flexible and closing member is being employed. For instance, the rigidity or flexibility of the flexible and closing member can be modified to reflect the fluid pressure desired to displace the closing member and to form flow passage on the flexible member. While a circular flexible member is shown in the figures, the flexible member is not limited to any one shape. The appropriate shape, size, thickness of the flexible member will be apparent to one of ordinary skill in the art reading the teaching herein.

Once the flow of the liquid through the fluid inlet ceases, the fluid pressure exerted against the closing member will drop or dissipate, and the flexible member (9) and the closing member will return to their original position and close off fluid communication to the brewing chamber at the opening (11) of the fluid inlet (5) The movement of the flexible member (9) and the closing member back to the original closed position dislodges or expels the liquid trapped or accumulated between or on the brewing chamber lid (2, 8), the water distribution plate (10) and the flexible member (9), thereby further reducing or eliminating spills from residual liquid.

Flexible Member with Channel/Cavity Forming Enhancements

In an embodiment, the upper surface of the flexible member is provided with slits that extend radially outward from the closing member to the perforations. The slits form a fluid passage, i.e., channels or cavity, when the fluid achieves the desired or predetermined pressure.

In an embodiment shown in FIGS. 7A and 7B, slits (20) extend outwardly at an incline, i.e., the slit is deeper at the end closer to the closing member protrusion (12A) and shallower at the end closer to the perforations (14). This arrangement will prevent liquid from prematurely flowing to the perforations (14). The angle of inclination, depth or length of the channel forming slits (20) can be varied depending on the operating condition of the brewing device, such as pressure of the liquid during the brewing process, the size, thickness and density/rigidity of the flexible member, and/or the width of the perforations/opening, etc., and will be readily apparent to a person of ordinary skill in the art reading the teaching herein. The inclined channels allow a small amount of liquid or water to accumulate before flowing through the perforations.

In addition and as shown in FIG. 8, the flexible member can be fabricated with channel/cavity facilitating sections (21), depressions, channels, portions or protrusions for providing controlled deformation of the flexible member. In an embodiment, the sections, depressions, channels, portions or protrusion have a higher density or rigidity than the surrounding area of the flexible member.

In a preferred embodiment, the channel/cavity facilitating sections (21) have a substantially triangular shape. In another embodiment, the channel/cavity facilitating sections are provided on the surface of the flexible member and/or within the flexible member itself.

In an embodiment, channel facilitating objects, such as plates, rods, beads or blocks, can be embedded or provided on the flexible member to control the formation of fluid passage, and to optimize the uniform distribution of liquid to the perforation. Typically, the channel/cavity facilitating objects have a higher density than the flexible member. The arrangement, size and position of these objects is apparent to one of ordinary skill in the art reading the teaching herein. Preferably, the objects are fabricated from metal, plastic, silicon rubber, natural rubber, other suitable rubber, ceramic material, polymer composite material, wood, or other equivalent material. In another embodiment, a combination of channel/cavity forming slits and channel/cavity facilitating objects are provided on a flexible member of the invention to achieve controlled deformation, and to obtain uniform distribution of liquid to the perforations.

A method for incorporating the flexible member as described above into a new or existing beverage brewing device, i.e., to prevent or eliminate the release of residual liquid before or after the brewing process, to prevent the premature release of liquid during the heating process or to expel liquid remaining in the brewing assembly after the brewing process, is disclosed, and is readily apparent to one of ordinary skill in the art reading the teaching herein.

EQUIVALENTS

Those skilled in the art will recognize, or be able to ascertain using no more than routine experimentation, many equivalents to the specific embodiments of the invention described herein. Such equivalents are intended to be encompassed by the following claims.

What is claimed is:

1. A brewing assembly, comprising an upper portion operatively connected to a lower portion, a seal for fluid-tight connection between the upper portion and the lower portion during brewing process, a fluid inlet provided on the upper portion, a distribution plate operatively attached to the upper portion, a flexible member provided between the distribution plate and the upper portion and coextensive with at least a portion of the surface of the distribution plate, and a brewing chamber defined by the upper and lower portion of the brewing assembly, the flexible member being characterized by including:
   A) a closing member for selectively establishing and interrupting fluid communication between the fluid inlet and the brewing chamber thereby blocking the flow of fluid to the distribution plate at other times,
   B) a recess substantially below the closing member to permit fluid pressure to displace or depress the closing member sufficiently into the recess to form a first fluid passage, and
   C) at least one second fluid passage through the flexible member remotely from the first fluid passage whereby the flexible member, under pressure of the fluid admitted to the recesses forms a third passage during brewing process extending between the first and each of the at least one second fluid passages to provide fluid communication from the fluid inlet to the brewing chamber.

2. The brewing assembly of claim 1, wherein the closing member is formed integrally with the flexible member and aligned with the fluid inlet, and wherein the closing member is biased to a closed position to interrupt fluid communication between the fluid inlet and the brewing chamber and to close each third passage.

3. The brewing assembly of claim 2, wherein the fluid pressure is between 0.1 and 1 bar.

4. The brewing assembly of claim 1, wherein the at least one second fluid passage comprises a radial array of openings to provide substantially even communication of the fluid to the distribution plate.

5. The brewing assembly of claim 4, wherein the flexible member comprises eight openings.

6. The brewing assembly of claim 5, wherein the openings are arranged in a circular configuration.

7. The brewing assembly of claim 1, wherein the flexible member is formed of a polymer material, a silicone material, a rubber, a silicon rubber, a polymer plastic, or a suitable heat-resistant, flexible polymer material.

8. The brewing assembly of claim 1, wherein the closing member is integrally formed as part of the flexible member.

9. The brewing assembly of claim 2, wherein walls forming the recess have a thinner wall thickness than a surrounding portion of the flexible member.

10. The brewing assembly of claim 1, wherein the flexible member and closing member are formed with an appropriate degree of rigidity or flexibility, depending on a fluid pressure needed, to form the third passages, the closing member being biased to a closed position to interrupt fluid communication between the fluid inlet and the brewing chamber prior to and after brewing process whereupon the third passages close.

11. A flexible member for preventing unintended or premature release of liquid in a brewing assembly, comprising:
  A) an opening provided on the flexible member and configured to provide uniform distribution of liquid to a brewing chamber;
  B) a closing member provided on one side of the flexible member, the closing member comprising a portion dimensioned and positioned for closing a fluid inlet on the brewing assembly; and
  C) a recess formed in the other side of the flexible member permitting the closing member to be displaced from a closed position to an open position when liquid flowing into the brewing assembly achieves a predetermined pressure, wherein the pressure causes elastic deformation of the flexible member and the displacement of closing member to the open position to form a fluid passage between the recess and the opening.

12. The flexible member of claim 11, wherein the flexible member further comprises a slit intermediate the opening and recess to enhance deformation of the flexible member.

13. The flexible member of claim 12, wherein each slit extends toward a perforation.

14. The flexible member of claim 11, further comprising sections having higher density or rigidity than surrounding area of the flexible member, each being configured to control deformation of the flexible member along the periphery of the object or section.

15. The flexible member of claim 11, wherein the fluid pressure is between 0.1 and 1 bar.

16. The flexible member of claim 11, wherein the flexible member is formed of a polymer material, a silicone material, a rubber, a silicon rubber, a polymer plastic, or a suitable heat-resistant, flexible polymer material.

17. The flexible member of claim 11, wherein the closing member is integrally formed as part of the flexible member.

18. The flexible member of claim 11, comprising eight openings arranged in a circular configuration wherein the flexible member forms a passage between the recess and a respective on of the openings.

* * * * *